United States Patent Office 3,119,369
Patented Jan. 28, 1964

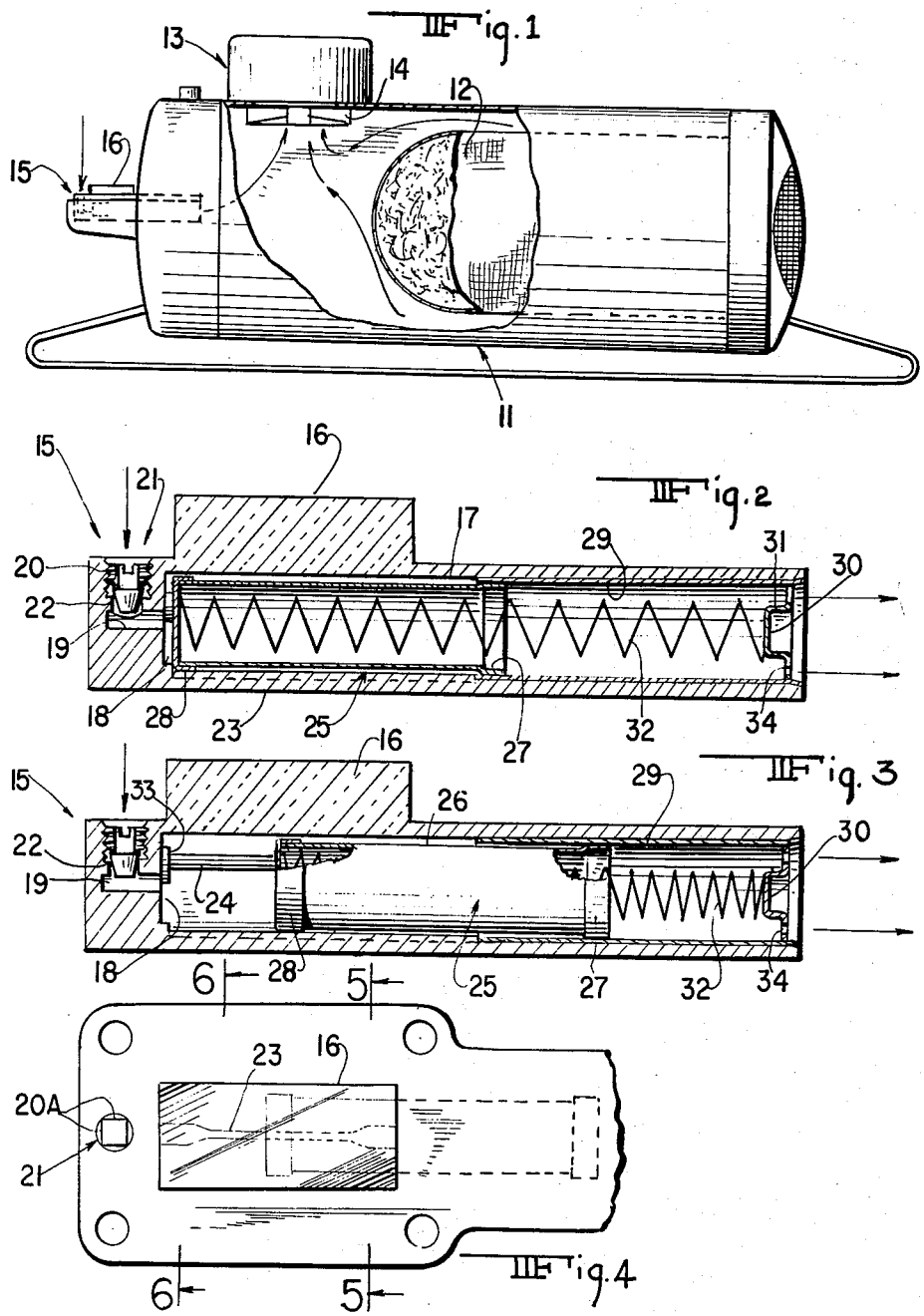

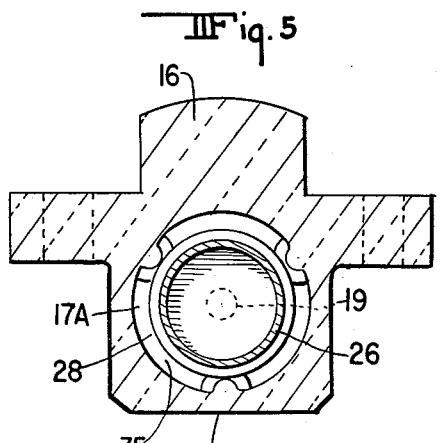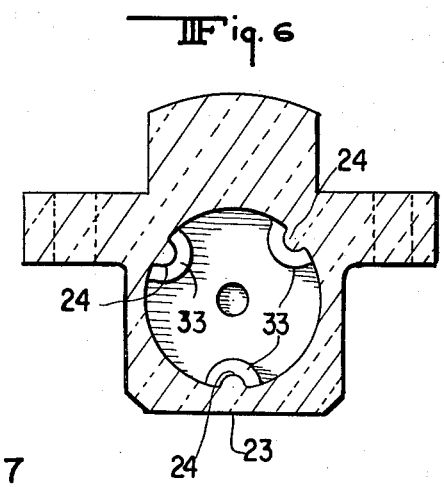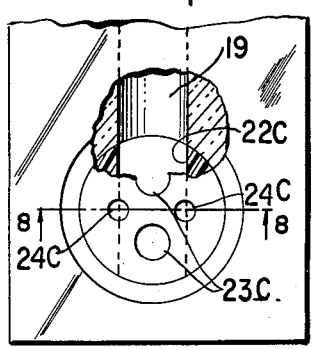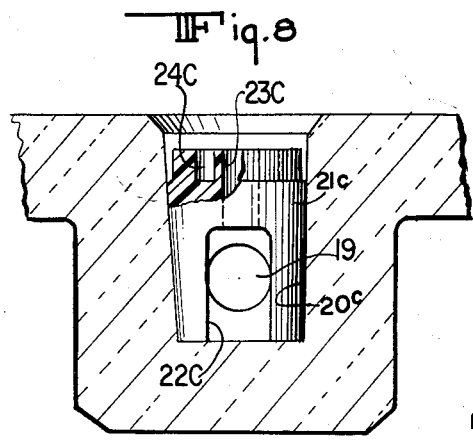

3,119,369
DEVICE FOR INDICATING FLUID FLOW
Philip W. Harland, Sellersville, and Harry W. Hoff, Jr., Quakertown, Pa., assignors to Ametek, Inc., a corporation of Delaware
Filed Dec. 28, 1960, Ser. No. 79,033
3 Claims. (Cl. 116—114)

This invention relates to a gauge and particularly to one adapted for use with a vacuum cleaner or the like.

The conventional vacuum cleaner employs a suction fan which draws dirt and refuse through a suction hose into a removable filter bag within the casing of the cleaner. When the filter bag of a vacuum cleaner becomes full or clogged, thereby decreasing the efficiency of the cleaner, the ordinary user may not be aware of this condition and such requires cleaning or replacement of the filter bag. It is desirable to provide an indicating means visible to the user of a vacuum cleaner to indicate the condition of the filter bag without dismantling the cleaner.

One of the objects of the invention is to provide indicating means for use on a vacuum cleaner arranged to enable the user to determine the condition of the filter bag.

Another of the objects of the invention is to provide a simple inexpensive fluid flow indicator.

In one aspect of the invention, an indicating gauge may be inserted in the casing or wall of a vacuum cleaner having a filter bag, motor and suction fan therein. The gauge may have a housing, at least a portion thereof formed of transparent material such as thermoplastic or thermosetting plastic, the housing having a passage therethrough. A piston means may be slidably positioned in one end of the passage, below a transparent window portion of the housing, the piston being adapted to slide with a desired clearance within a metal sleeve or the like positioned in the other end of the passage. Suitable colored indicating means may be provided on the gauge below the window, such that the indicating means is normally covered by the piston means and adapted to be exposed or uncovered by movement of the piston means away from its normal position. The indicia, of course, may take various forms, it being merely necessary to have a contrast between the movable portion and background of the gauge housing. The gauge may also be used for other purposes where it is desired to have an indication of flow.

Other objects, advantages and features will become apparent from the following description and drawings which are merely exemplary.

In the drawings:

FIG. 1 is a partially broken side elevational view;

FIG. 2 is an enlarged vertical sectional view of the gauge with the piston means in indicia covering position;

FIG. 3 is a view similar to FIG. 2 with the piston means in indicia uncovering position;

FIG. 4 is a plan view of one end of the gauge shown in FIG. 3 illustrating the viewing window with the piston means in indicia uncovering position;

FIG. 5 is a further enlarged vertical sectional view along the line 5—5 of FIG. 4;

FIG. 6 is a further enlarged vertical sectional view along line 6—6 of FIG. 4;

FIG. 7 is a plan view on an enlarged scale of a modified form of control valve; and FIG. 8 is an elevational view of the valve shown in FIG. 7 with parts shown in section along line 8—8 of FIG. 7.

The invention will be described in conjunction with a vacuum cleaner wherein cleaner 11 (FIG. 1) has a filter bag 12 mounted therein to collect refuse or dirt. Motor 13 and fan 14 driven thereby are mounted on the casing of the cleaner so as normally to draw air with refuse or dirt through a conventional attached suction hose into the filter bag. As the bag becomes full or clogged, the suction through the hose will diminish, thereby decreasing the efficiency of the cleaner. Such requires cleaning or replacement of the filter bag from time to time.

The gauge 15 is positioned in a wall opening of the cleaner such that the inwardly extending portion of the gauge is located in close proximity to the fan, whereby, when the filter bag becomes full or clogged and little or no air is being drawn through the suction hose and filter bag, the fan will tend to draw air through the gauge.

The gauge preferably is formed of a transparent plastic material and has a top viewing window portion 16 (FIGS. 2 and 3), on one end thereof adapted to be exteriorly mounted adjacent the aforementioned wall opening. The major or bottom portion of the gauge is provided with a cylindrical bore 17 extending from the other or inner end of the gauge substantially therethrough. The bore 17 terminates at recessed shoulder 18 in which a small central bore 19 is provided which is in communication with the vertical threaded opening 20. Opening 20 is adapted to receive a threaded metering or flow control valve 21 which may be adjusted relative to valve seat 22, the latter being interposed between the bore 19 and opening 20. The metering valve has portions removed from its lateral or threaded surfaces to provide openings or air passages 20A permitting communication between bore 19 and the exterior of the gauge. Thus the flow of air drawn from the exterior of the gauge through passages 20A into bore 19 may be regulated by adjustment of metering valve 21.

In FIGS. 7 and 8 a different form of metering or control means is illustrated. In this form the vertical bore 20C, communicating with the central bore 19, merely has a smooth cylindrical taper to receive a plastic rotatable adjustment plug 21C having a mating outer cylindrical taper and a lateral passage 22C in communication with inlet air holes 23C. Adjustment holes 24C are provided for reception of a spanner wrench or the like to rotate the adjustment plug 21C into and out of communication with the bore 19.

On the bottom of the gauge below the window portion there may be indicia 23, such as a red stripe or the like, or other means contrasting with piston 25. A plurality of longitudinal ribs 24 (FIGS. 5 and 6) are adapted to receive piston means 25 which normally covers the indicia. The piston means comprises a substantially cylindrical metal tube 26 with a flared-out portion 27 at its open end and a cap 28 concentric therewith adapted to slide on the ribs 24. A cylindrical metal sleeve 29 of uniform inside diameter is close or press fit in the inner portion of bore 17 and the inner ends of the sleeve and gauge housing are sealed to prevent air leakage therebetween as by heat sealing or other sealing means. The metal sleeve 29 slidably receives with clearance the flared portion 27 of the tube. Adjacent the inner end of the sleeve a spring clip or retaining member 30 having a central annular flange or protrusion 31 is provided to receive one end of coil spring 32 which biases piston 25 against inward radial protrusions 33 to cause the piston means to cover indicia 23. Merely by way of example, the clearance between the flared tube portion 27 and sleeve 29 may be in the range of 0.003" to 0.007", sufficient to provide an annular air passage communication between the space 17A inside bore 17 adjacent cap 28 and the retaining member openings 34.

When the filter bag becomes full or clogged, the fan tends to draw more air from the space 35 past the piston 25 and the clearance adjacent the flared portion 27 and through openings 34. This increase in air flow acts on the piston 25 to overcome the bias of spring 32 and unseat the piston cap from protrusions 33 such that the piston means is moved away from its normal indicia covering position.

It should be apparent that details of construction can

What is claimed is:

1. In a vacuum cleaner having a motor, a fan driven by said motor, and a filter bag mounted in close proximity to said fan, condition indicating means mounted on a wall of the cleaner in close proximity to said fan for indicating the varying amounts of refuse collected in said filter bag, said condition indicaitng means comprising a gauge housing having an air passage therethrough for directly connecting the interior suction air space within the cleaner with the exterior atmosphere, indicia located in said passage, piston means in said air passage and normally covering said indicia, means including narrow longitudinally disposed ribs in said passage spacing said piston means from the housing throughout a substantial portion of the length of travel of said piston means, and a valve at the inlet end of said passage setting the rate of air flow therethrough, said piston means being responsive, when a predetermined condition exists, to air drawn by said fan through said passage to move within said passage and uncover said indicia.

2. In a gauge for indicating the condition of a vacuum cleaner filter bag the combination comprising a housing having at least a portion thereof formed of transparent material, said housing having a passageway therethrough and having one end adapted to be mounted in direct communication with the filter bag chamber, slidable piston means mounted in said passageway and normally underlying said housing transparent portion, said slidable piston means having a surface contrasting with said transparent portion of said housing, means urging said slidable piston means toward its normal underlying position, means including narrow longitudinal ribs in said passageway spacing said piston means from said housing throughout a substantial portion of the length of travel of said slidable means, to maintain said passageway free to pass fluid at all times, and a valve at the inlet end of said passageway setting the rate of fluid flow therethrough, such that when fluid is drawn through said passageway and valve in opposition to said urging means, said slidable piston means will move away from its normal position toward said urging means and change the contrasting relation between at least a portion of said transparent portion and said slidable means.

3. In a gauge responsive to the flow of fluid therethrough the combination comprising a housing having at least a portion thereof formed of transparent material, said housing having a passageway therethrough and having inlet and outlet ends, indicia means in the inlet end of said passageway and having a surface portion underlying and contrasting with said transparent portion, slidable piston means mounted in said passageway and normally underlying said housing transparent portion and overlying said indicia means, said slidable piston means having a surface contrasting with said transparent portion and said indicia surface portion, means urging said slidable piston means toward the inlet end of said passageway and its normal underlying and overlying positions, and means in said passageway spacing said piston means from said housing throughout a substantial portion of the length of travel of said slidable means to maintain said passageway free to pass fluid at all times, said spacing means including a plurality of narrow longitudinal ribs formed on the surface of the inlet part of said housing passageway and in the exit end of said passageway a metal sleeve fixedly secured therein, said slidable piston means including a longitudinal metal tube having an open outwardly flared end and closed on the other end by a concentrically mounted cap, the cap having a rim which rests on said narrow ribs and the flared piston and arranged to slide in said metal sleeve, a retaining member mounted in the exit end of said sleeve, said urging means being interposed between said cap and retaining member to bias said slidable means away from the latter toward the inlet end of said passageway, such that when fluid is drawn through said passageway in opposition to said urging means, said slidable means will move away from its normal position toward said urging means and tend to uncover said indicia surface portion, and a valve in the passageway inlet setting the rate of fluid flow therethrough.

References Cited in the file of this patent

UNITED STATES PATENTS

| 1,910,752 | Coles | May 23, 1933 |
| 2,137,102 | Terrell | Nov. 15, 1938 |
| 2,174,604 | Smellie | Oct. 3, 1939 |
| 2,325,188 | Lofgren | July 27, 1943 |
| 2,700,362 | Calling | Jan. 25, 1955 |
| 2,753,831 | Davies | July 10, 1956 |
| 2,843,077 | Leefer | July 15, 1958 |

FOREIGN PATENTS

| 815,897 | France | Apr. 19, 1937 |
| 401,195 | Great Britain | Nov. 9, 1933 |